Jan. 9, 1923.

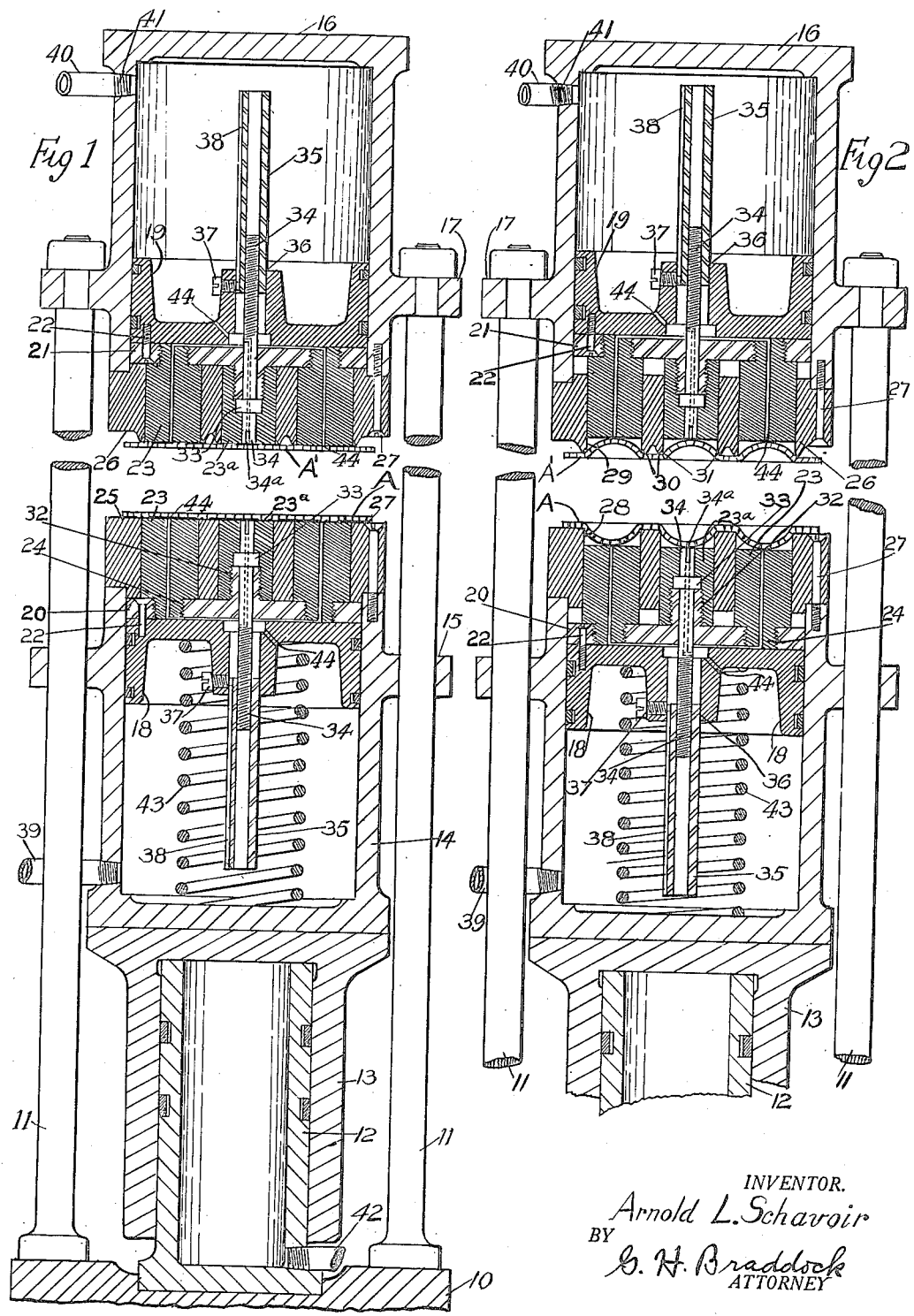

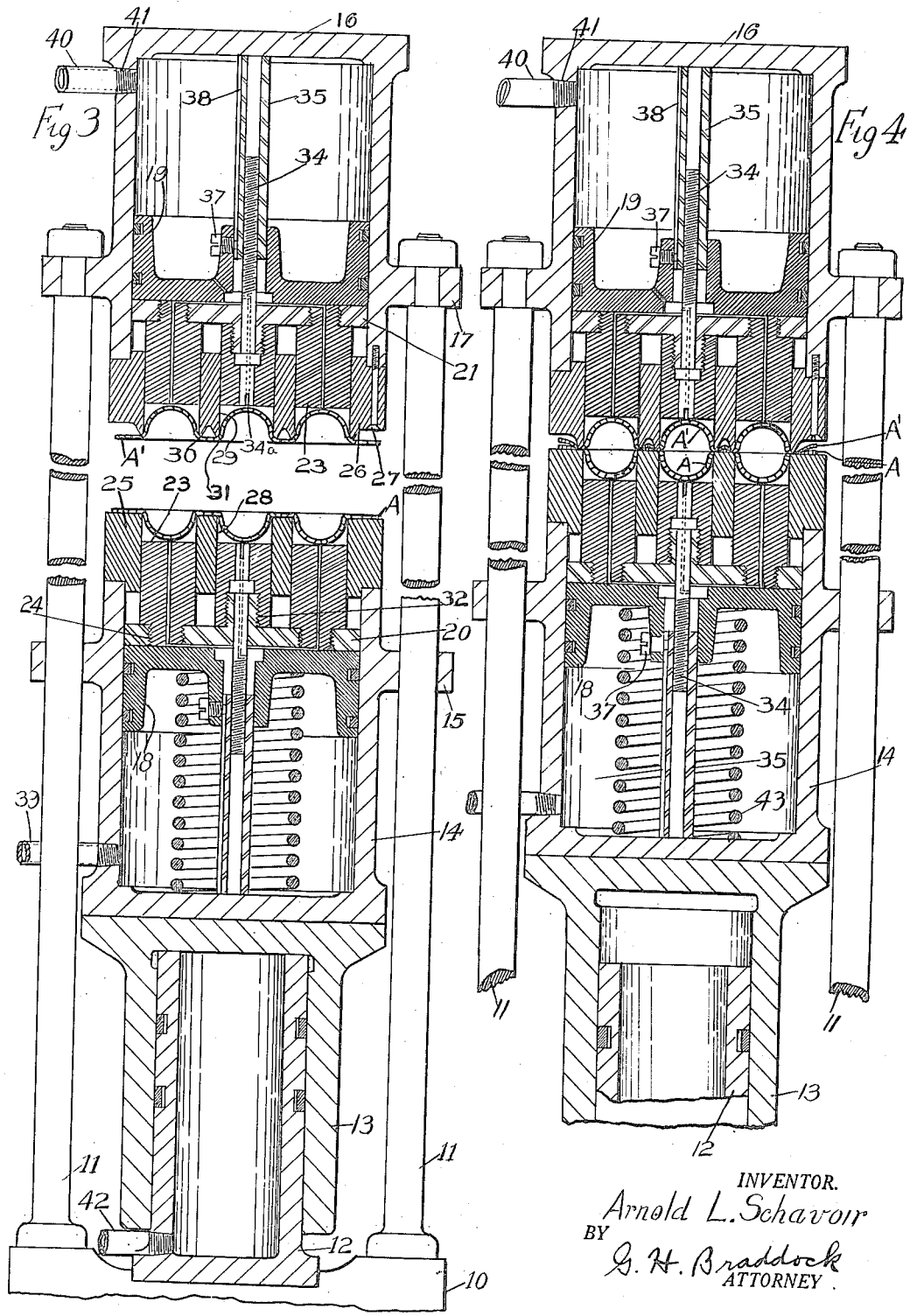

A. L. SCHAVOIR.
METHOD OF AND APPARATUS FOR MAKING HOLLOW RUBBER ARTICLES.
FILED FEB. 23, 1922.

INVENTOR.
Arnold L. Schavoir
BY
G. H. Braddock
ATTORNEY

Patented Jan. 9, 1923.

1,441,603

UNITED STATES PATENT OFFICE.

ARNOLD L. SCHAVOIR, OF STAMFORD, CONNECTICUT.

METHOD OF AND APPARATUS FOR MAKING HOLLOW RUBBER ARTICLES.

Application filed February 23, 1922. Serial No. 538,639.

*To all whom it may concern:*

Be it known that ARNOLD L. SCHAVOIR, a citizen of the United States, and resident of Stamford, in the county of Fairfield and State of Connecticut, has invented certain new and useful Improvements in Methods of and Apparatus for Making Hollow Rubber Articles, of which the following is a specification.

This invention relates to a method of and an apparatus for making hollow articles of rubber or like substances.

The broad object of the invention is to provide a simple method and a novel apparatus which will be an improvement generally upon all methods and apparatuses now being employed in the manufacture of hollow articles of the present nature from plastic materials.

Heretofore, much labor and great expense have been necessitated in the manufacture of various hollow rubber articles, such for example as balls, tennis-balls, and syringe-bulbs, by reason of the fact that the walls of such articles must be, in order to meet their requirements of use, of uniform thickness throughout. A number of methods and apparatuses have from time to time been devised with the end in view of economically manufacturing hollow rubber articles the walls of which were of uniform thickness, but for some reason or another such methods and apparatuses have been unsatisfactory. In certain cases, the methods and apparatuses have been prohibitive because not capable of producing hollow rubber articles at expense low enough to meet competition, while in other cases the more economical methods and apparatuses have failed to put out high grade articles. In fact, a number of factories are at the present time manually finishing certain of their hollow rubber articles, which practice is, obviously, expensive and not aimed toward supplying the trade with products that can be inexpensively purchased.

An object of the present invention is, therefore, to provide a method that can be economically practiced to produce a hollow rubber article of any shape or size which will have a wall of uniform thickness throughout its entire area, and a further object is to devise a simple apparatus capable of carrying out the steps of the method.

Another object is to provide a method and an apparatus of the present character adapted to the purpose of uniformly drawing, spreading, or stretching stock of rubber or like substance, usually in sheet form, over the entire area of the stock to form the parts or halves of a hollow article being produced and to make the walls of said parts or halves of equal and uniform thickness, and also to equip the apparatus with means for severing surplus stock from the different parts or halves of the article and for securing the parts or halves of the shaped stock to each other to produce the "biscuit" of the article being manufactured.

A still further object is to provide a method including as one of its operations the sucking of stock into a form or mold, the sucking of the stock being from the circumference of said form or mold toward or to the center thereof over the entire area of the stock, the form or mold being in outline of the general configuration of the part or half of the article being made.

Still another object is to provide an apparatus including a plurality of suction plungers adapted to have movement in forms or molds to produce by suction the beforementioned parts or halves, and also including severing and sealing knives adapted to sever the surplus stock and to seal together the parts or halves of stock to produce the "biscuit," one form or mold or one set of forms or molds preferably being stationarily supported, and the other form or set being adapted to have reciprocatory movement toward and from the first mentioned form or set.

Another object of the invention is to provide an apparatus the suction plungers, the forms or molds, and the severing and sealing knives of which can be removed to be replaced by others of different shape, design or construction, without the necessity of other alterations in the apparatus, except the making of a slight adjustment to rectify the distance of movement of the plungers in the forms or molds, depending upon the nature and size of the article to be produced.

Yet another object is to equip the apparatus with air actuated mechanism for causing the forms or molds with their severing and sealing knives to move against each other in the accomplishment of the severing and sealing operation, the air actuated mechanism being capable of accomplishing the severing and sealing operation in quicker and more improved manner, the movement of the movable forms or molds toward and from the stationary forms or molds requiring less time, thus increasing the output of a single apparatus, and the air actuated mechanism furnishing a more durable and secure union between the parts or halves of the "biscuit".

To the accomplishment of the before-mentioned objects, I desirably utilize a pair of carrying heads, and I equip each of said heads with one or more suction plungers adapted to reciprocate in forms or molds certain of which may be stationary and may have severing and sealing knives and others of which may be movable, and I provide in connection with the movable forms or molds, an air press, or equivalent device, for actuating said forms or molds toward and away from the stationary forms or molds in order that the severing and sealing knives can perform their function, all as will now be fully described and will hereinafter be specifically claimed, it being understood that the disclosure herein is merely illustrative of the principles of the invention and meant to in no way limit the scope of the appended claims.

In the accompanying drawing forming a part of this specification,

Fig. 1 is a vertical, central sectional view of an apparatus embodying the features of the invention and illustrating a manner in which the method can be practiced, the carrying heads, their suction plungers, and the air actuating mechanism with its movable forms or molds all being in their normal, inactive positions;

Fig. 2 is a view corresponding with the showing of Fig. 1, but disclosing the carrying heads and their suction plungers in the act of drawing, spreading or stretching the stock into the forms or molds;

Fig. 3 is a view corresponding with the showings of Figs. 1 and 2, but disclosing the carrying heads at the completion of the suction strokes of the plungers;

Fig. 4 is a view corresponding with the showing of Fig. 3, but disclosing the movable cylinder of the air actuated mechanism in the position it assumes as the severing and sealing knives perform their function;

Figure 5:
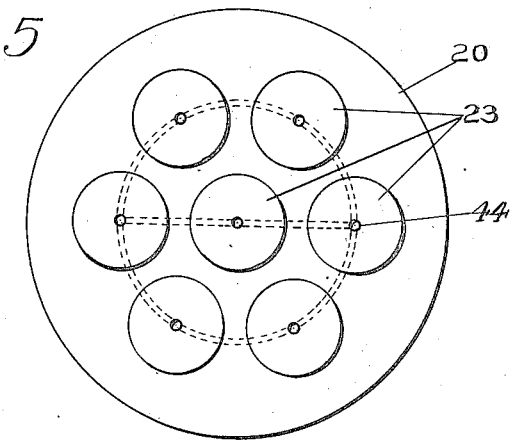
Fig. 5 is a plan view of the suction plungers of Figs. 1 to 4, together with the plate by which the plungers are carried, removed from the apparatus.
Figure 6:
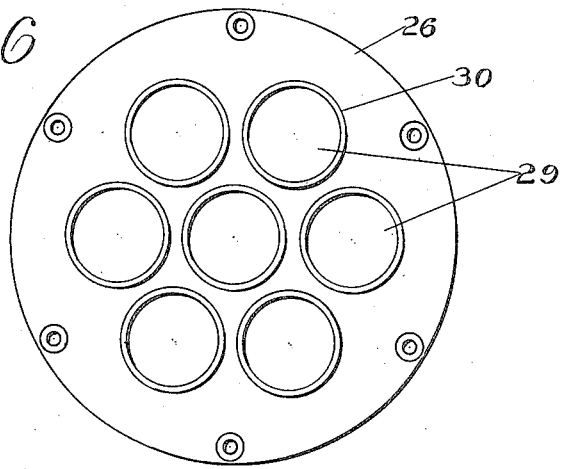
Figure 7:
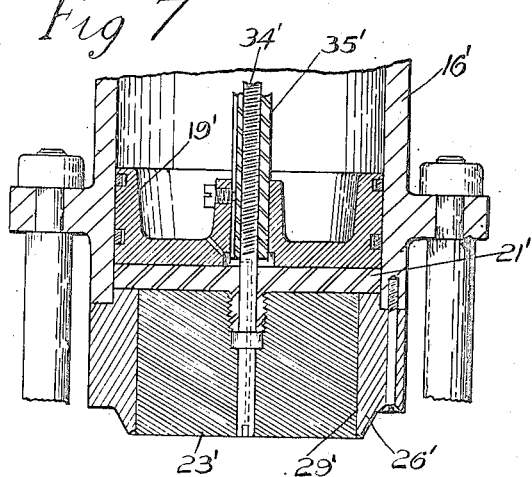

Fig. 6 is a plan view of forms or molds with severing and sealing knives capable of use in connection with the suction plungers of Fig. 5; and Fig. 7 is a fragmentary sectional view, corresponding with the showing of Figs. 1 to 4, disclosing a modified form of the invention wherein the carrying head supports a single large suction plunger adapted to reciprocate in a single form or mold having a severing and sealing knife.

Referring to the drawing, 10 denotes a stand having any desired number of uprights and guide posts 11 and supporting stationary cylinder 12 of an air press, the movable cylinder 13 of which supports a form- or mold-carrying member 14 having lugs or extensions 15 slidably arranged upon the standards and guide posts 11.

Numeral 16 denotes a similar form- or mold-carrying member having lugs or extensions 17 fixed upon the upper portions of the standards and guide posts 11. The form- or mold- carrying members may be of any suitable construction for their purpose. As shown, each is a cylinder having a closed and an open end.

Numerals 18 and 19 denote carrying heads or pistons arranged in the cylinders 14 and 16, respectively. 20 and 21 denote plates removably attached to the carrying heads or pistons 18 and 19, as by means of the screws 22, and 23 denotes suction plungers secured to the plates 20 and 21 in any manner, as by means of the threaded necks 24 upon the suction plungers arranged in threaded openings in the plates. 25 and 26 represent members attached to the open ends of the cylinders 14 and 16, as by means of the screws 27, and including forms or molds 28 and 29 adapted to slidably receive the suction plungers 23. As will be most clear from the drawing, the forms or molds 29 are provided with severing and sealing knives each including a cutting edge 30 and a sealing face 31 cooperating in usual manner with the cutting edge, while the forms or molds 28 are shaped adjacent their free ends to assist the cutting edge and the sealing face in the severing and sealing operation.

While all of the suction plungers may be attached to the plates 20 and 21 in the same manner, the central plunger 23$^a$ of each carrying head is desirably arranged upon a threaded shoulder 32 of each plate 20 and 21, and each suction plunger 23$^a$ desirably includes a pocket to receive and rotatably retain an enlargement 33 upon each adjustment screw 34 threadably arranged in adjustment tubes 35 slidable in the carrying heads or pistons 18 and 19, as at 36, but fixed against rotation in said carrying heads or pistons by means of set screws 37 arranged in the carrying heads or pistons and in keyways 38 of the adjustment tubes 35.

Numerals 39 and 40 represent pipes leading from vacuum producing means of any character and entering the cylinders 14 and 16 as denoted at 41, and 42 represents a pipe similarly entering the stationary cylinder of the air press and having communication with a source of air supply.

In Fig. 1 of the drawing the cylinders 14 and 16, the members 25 and 26, their forms or molds, the carrying heads or pistons 18 and 19, the suction plungers 23 and 23$^a$ and the movable cylinder 13 of the air press are all shown in their normal, inactive positions, and rubber stock A and A' is shown arranged across the ends of the forms or molds of the members 25 and 26, respectively, which are adjacent each other. In Fig. 2 the suction plungers are shown as when moving away from the rubber stock A and A', the vacuum producing means connected with the cylinders 14 and 16 having been actuated to exhaust air from the chambers of said cylinders at the rear of the carrying heads or pistons 18 and 19, and the rubber stock is shown as being drawn, spread, or stretched into the forms or molds. In Fig. 3 the suction plungers are shown at their farthest distance apart to shape the material of the stock A and A'. Obviously, all of the suction plungers have sucked from the circumferences of the forms or molds toward and to the centers thereof over the entire areas of the various parts or halves of the "biscuits" of the ball or other articles being made, with the result that the stock has been uniformly drawn, spread, or stretched into the forms or molds so that the walls of the parts or halves are of equal and uniform thickness throughout. It is believed that the truth of the remark just made is apparent from the drawing. As a matter of fact, the statement is made as one of positive knowledge based on experiments and experience. In Fig. 4 the movable cylinder 13 of the air press is shown in the position it assumes to cause the severing and sealing knives of the different forms or molds to seal the "biscuits" and remove the surplus stock. This operation is plainly shown in Fig. 4 and is not sufficiently unlike the operation usually performed to seal "biscuits" to require further description, other than to remark that the air actuated mechanism or air press is quicker and more positive in its action than the hydraulic press ordinarily employed, it building up power to exert a yielding blow in the final stage of the severing and sealing operation to produce a more durable and secure seal and, at the same time necessitating less wear upon the cutting edges of the knives. The moment the air is released from the interior of the air press, the movable cylinders 13 and 14 immediately return by gravity, from their position of Fig. 4 to their position of Fig. 3, to space the members 25 and 26 at suitable distance apart to allow removal of the finished "biscuits". Then when the vacuum in the cylinders 14 and 16 is destroyed the pistons 18 and 19 return to their normal position as in Fig. 1, the piston or carrying head 19 returning by gravity, and the piston or carrying head 18 returning by reason of power exerted by the coil spring 42 arranged between said piston or carrying head and the cylinder 14. As the suction plungers move toward each other the "biscuits" are, naturally pushed from the forms or molds, thus removing an objectionable feature which has sometimes heretofore existed, viz., "sticking" of the "biscuits."

Numeral 43 denotes a continuous air passage, leading from the vacuum chambers of the cylinders 14 and 16, respectively, communicating through the suction pistons, to a point approximately at the center and at the open end of each form or mold. While this continuous air passage may not be necessary in any or all cases, it is designed to perform the function of positively releasing any air which may become trapped between the stock A and A' and the forms or molds, and the further function of providing a centering means for the stock A and A'.

Each of the adjustment screws 34 is provided with a slot 34$^a$ which is conveniently accessible to move adjustment tubes 35 toward or away from the closed ends of the cylinders 14 and 16 to regulate the extent of movement of the suction plungers in the forms or molds, all as will be understood. Engagement of the plates 20 and 21 with the inner faces of the members 25 and 26 limits the movement of each carrying head in one direction, while engagement of the adjustment tubes with the closed ends of the cylinders limits the movement of each head in opposite direction. It is unnecessary to say that the free ends of the suction pistons are desirably made to be in exact alignment with the outer edges of their respective forms or molds when the suction pistons are in their normal, inactive positions.

While I have described the form- or mold-carrying members 14 and 16 as cylinders each having a vacuum chamber, it will be apparent that the carrying heads 18 and 19 can be reciprocated to move the suction plungers 23 and 23$^a$ in the forms or molds in some different manner, as by means of mechanical devices not shown.

In Fig. 7 I have disclosed a slightly modified form of the invention. In said figure the plate 21', designed to be attached to the carrying head 19' in about the manner the plate 21 is attached to the carrying head 19, is provided with a single, large suction plunger 23', and the member 26' constitutes a single form or mold 29' slidably receiving the suction plunger 23'. The member 26' may be attached to the cylinder 16' in the manner in which the member 26 is attached to the cylinder 16. The modified form just described makes it plain that I have devised an apparatus the suction plunger, the forms or molds, and the severing and sealing knives of which can be removed and replaced by others of different shape, design or construction without altering any of the other parts of the apparatus. The carrying head of Fig. 7 must, obviously, have a reciprocatory stroke of greater length than the carrying heads 18 and 19 of Figs. 1 to 4. The stroke is rectified by merely turning the screw 34' to move the adjustment tube 35' away from the closed end of the piston 16', engagement of the free end of said tube 35' with the closed end of the cylinder 16' limiting the stroke of the carrying head.

The "biscuits" may be vulcanized in usual manner when formed. Obviously, the forms or molds can have any preferred outline to produce a hollow article of any desired shape.

The method and apparatus as clearly illustrated and fully described, while just as simple as any method heretofore known for producing hollow rubber articles, even those the walls of which are not required to be of uniform thickness, will produce at minimum cost high grade articles required to meet the severest tests of use.

Having thus fully described the invention, what I claim as new and desire to secure by Letters Patent is:—

1. The method of making a part of a hollow article having a wall of uniform thickness throughout the area of said part, which consists in placing stock over a form and in applying suction to the stock progressively from adjacent the form toward to center of the stock to evenly draw the stock into the form.

2. The method of making a part of a hollow article the wall of which part is of uniform thickness throughout its area, which consists in placing stock over a form of the approximate shape of said part and in applying uniform suction to the stock over a portion of its area progressively from adjacent the form toward the center of the stock to evenly draw the stock into the form.

3. The method of making a part of a hollow article the wall of which part is of uniform thickness throughout its area, which consists in placing stock over a form and in applying uniform suction to the stock to evenly draw the same into the form, the suction being first applied to portions of stock spaced from the center thereof, thence toward the center over a considerable area of the stock.

4. The method of making a hollow article having a wall of uniform thickness throughout the area of the article, which consists in producing each component part of the article by applying uniform suction to stock to evenly draw the same into a form, the suction being first applied to portions of stock spaced from the center of the form, thence toward the center over a considerable area of the stock.

5. The method of making a hollow article having a wall of uniform thickness throughout the area of the article, which consists in producing each component part of the article by applying uniform suction to stock to evenly draw the same into a form, the suction being first applied to portions of stock spaced from the center of the form, thence toward the center over a considerable area of the stock, and in afterwards securing said parts together to produce the "biscuit" of the article.

6. The method of making a hollow rubber article having a wall of uniform and equal thickness throughout the area of the article, which consists in producing each component part of the article by applying uniform suction to stock to evenly draw the same into a form, the suction being first applied to portions of stock at or adjacent the margin of said stock, thence toward the center over the entire area of the stock, in afterwards securing said parts together to produce the "biscuit" of the article, and in vulcanizing the "biscuit".

7. The method of making a hollow rubber article having a wall of any preferred thickness throughout the area of the article, which consists in producing the component parts of the article by placing sheet rubber stock over oppositely arranged forms, in applying suction to the stock, first to portions spaced from the center thereof, thence toward the center over a considerable area of the stock, to draw the same evenly and uniformly into the forms, and in moving the forms against each other to secure the component parts together and to remove surplus rubber stock.

8. In an apparatus of the character described, a suction plunger and a form in which the same is movable, said suction plunger adapted to the purpose of evenly and uniformly drawing stock into said form.

9. In an apparatus of the character described, a suction plunger and a form in which the same is snugly slidable, said suction plunger adapted to the purpose of applying suction to stock arranged upon the form to draw said stock into said form.

10. In an apparatus of the character described, a pair of oppositely arranged forms, a suction plunger in each form, said plungers adapted to the purpose of evenly drawing plastic stock into the forms, means for reciprocating the suction plungers, and means for moving the forms toward and from each other.

11. In an apparatus of the character described a pair of forms, one of said forms having a cutting edge and sealing face, a suction plunger slidable in each form, and means for moving the forms against each other.

12. In an apparatus for making a hollow article, a form and a suction plunger movable therein, the suction plunger adapted to the purpose of evenly drawing plastic stock into the form to produce a part of the article, the wall of said part being of uniform thickness throughout.

13. In an apparatus for making a hollow rubber article, a pair of forms, a suction plunger slidably arranged in each form and adapted to the purpose of evenly drawing plastic stock into the forms to produce halves of the article having walls of uniform thickness throughout, and means for moving the forms against each other.

14. In an apparatus for making a hollow rubber article, a pair of spaced apart forms, one of the forms including a cutting edge with sealing knife, a plunger slidable in each form and adapted to evenly draw rubber stock into the forms to produce the halves of the article having walls of equal and uniform thickness throughout, and means for moving the forms together whereby the cutting edge and sealing face may secure the halves to each other and remove surplus stock.

15. In an apparatus of the character described, a carrying head, a suction plunger set up to move therewith, and a form in which the suction plunger reciprocates.

16. In a device of the character described, a pair of spaced apart forms, a suction plunger in each form, a reciprocatory carrying head for each plunger, means for actuating the carrying heads whereby rubber stock may be uniformly drawn into the forms to produce halves of a hollow rubber article having walls of equal and uniform thickness throughout, and means for moving the forms against each other to secure the halves together.

17. In an apparatus for making a hollow rubber article the wall of which is the same thickness throughout, a pair of spaced apart forms, a suction plunger movable in each form, carrying heads for each plunger, means for reciprocating the carrying heads, and means for moving the forms against each other.

18. In an apparatus of the character described, a stationary cylinder having a closed end and an open end, a movable cylinder also having a closed and open end, a form upon the open end of each cylinder, a piston in each cylinder and carrying a suction plunger, said suction plungers adapted to reciprocate in the forms, means for producing vacuum in the cylinders to cause the suction plungers to recede in the forms, and means for moving the forms against each other.

19. The combination as specified in claim 18, wherein there is a continuous air passage leading from the interiors of the cylinders, through the suction plungers, to the free ends of the forms.

20. In a device of the character described, a form, a member by which the same is carried, a suction plunger slidable in the form, a plate to which the suction plunger is secured, and a carrying head for the plate.

21. In a device of the character described a form carrying member, a form removably supported thereon, a carrying head, a plate removably supported on the carrying head, and a suction plunger upon the plate, whereby the form and suction plunger may be removed from the form carrying member and the carrying head, respectively, to be replaced by a form or forms and a suction plunger or plungers of different shape, size or construction.

22. A device of the character described, comprising a stationary cylinder and a movable cylinder, air actuated mechanism for reciprocating the movable cylinder to cause the same to move toward or from the stationary cylinder, a piston constituting a carrying head slidable in each cylinder, a plate upon each carrying head, a suction plunger secured to each plate, a form upon each cylinder and in which the suction plungers are slidable, means for creating vacuum in the cylinders to cause the suction plungers to recede in the forms, an adjustable device limiting the distance the plungers can recede in the forms, and means whereby the plungers can return to their normal positions when the vacuums are destroyed.

23. A device of the character described, comprising a stationary form and a movable form, air actuated mechanism for reciprocating the movable form to cause the same to move toward and from the stationary form, a suction plunger in each form, and means for reciprocating the suction plungers.

24. In an apparatus of the character described, a form and means associated therewith for evenly and uniformly drawing stock into said form, said means adapted to exert suction over a considerable area of said stock, first applying suction to portions of the stock spaced from the center thereof, thence to portions closer to said center.

Signed at Stamford in the county of Fairfield and State of Connecticut this 10 day of February A. D., 1922.

ARNOLD L. SCHAVOIR.